United States Patent
Lee et al.

(10) Patent No.: US 12,308,381 B2
(45) Date of Patent: May 20, 2025

(54) SOLID ELECTROLYTE MEMBRANE INCLUDING SOLID ELECTROLYTE MATERIAL FILLED INTO HEAT TREATED POROUS POLYMER SHEET, METHOD FOR MANUFACTURING SAME AND SOLID-STATE BATTERY INCLUDING SAME

(71) Applicant: LG CHEM, LTD., Seoul (KR)

(72) Inventors: Jung-Pil Lee, Daejeon (KR); Eun-Bee Kim, Daejeon (KR); Sung-Ju Cho, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 455 days.

(21) Appl. No.: 17/268,749

(22) PCT Filed: Apr. 29, 2020

(86) PCT No.: PCT/KR2020/005757
§ 371 (c)(1),
(2) Date: Feb. 16, 2021

(87) PCT Pub. No.: WO2020/226361
PCT Pub. Date: Nov. 12, 2020

(65) Prior Publication Data
US 2021/0328260 A1   Oct. 21, 2021

(30) Foreign Application Priority Data
May 3, 2019   (KR) ........................ 10-2019-0052529

(51) Int. Cl.
*H01M 10/0562* (2010.01)
*H01M 10/0525* (2010.01)
(Continued)

(52) U.S. Cl.
CPC ... *H01M 10/0562* (2013.01); *H01M 10/0525* (2013.01); *H01M 50/403* (2021.01);
(Continued)

(58) Field of Classification Search
CPC ......... H01M 10/0562; H01M 10/0525; H01M 50/403; H01M 50/417; H01M 50/491; H01M 50/449
(Continued)

(56) References Cited

U.S. PATENT DOCUMENTS

| 5,968,994 A | 10/1999 | Hashimoto et al. |
| 9,546,253 B2 | 1/2017 | Noumi et al. |

(Continued)

FOREIGN PATENT DOCUMENTS

| CN | 1173425 A | 2/1998 |
| CN | 101730954 A | 6/2010 |

(Continued)

OTHER PUBLICATIONS

International Search Report (PCT/ISA/210) issued in PCT/KR2020/005757, dated Aug. 14, 2020.
(Continued)

*Primary Examiner* — Sean P Cullen
(74) *Attorney, Agent, or Firm* — Birch, Stewart, Kolasch & Birch, LLP

(57) ABSTRACT

Disclosed is a method for manufacturing a solid electrolyte membrane for a solid-state battery and a solid electrolyte membrane obtained thereby. The solid electrolyte membrane for a solid-state battery includes a heat treated porous polymer sheet and a solid electrolyte material, wherein solid electrolyte material and the porous polymer sheet form a composite in such a manner that the pores of the porous polymer sheet is filled with the solid electrolyte material. In this manner, it is possible to provide a solid electrolyte
(Continued)

membrane for a solid-state battery which has high mechanical strength and high ion conductivity.

4 Claims, 3 Drawing Sheets

(51) Int. Cl.
　　*H01M 50/403* (2021.01)
　　*H01M 50/417* (2021.01)
　　*H01M 50/449* (2021.01)
　　*H01M 50/491* (2021.01)

(52) U.S. Cl.
　　CPC ....... *H01M 50/417* (2021.01); *H01M 50/449* (2021.01); *H01M 50/491* (2021.01); *H01M 2300/0068* (2013.01)

(58) Field of Classification Search
　　USPC .................................. 429/144, 251, 254, 322
　　See application file for complete search history.

(56) References Cited

U.S. PATENT DOCUMENTS

| | | | |
|---|---|---|---|
| 2006/0222922 A1 | 10/2006 | Murphy | |
| 2007/0196638 A1* | 8/2007 | Wei | H01M 50/457 264/41 |
| 2009/0065127 A1 | 3/2009 | Lee et al. | |
| 2009/0098341 A1* | 4/2009 | Takita | B01D 71/26 428/159 |
| 2009/0219672 A1* | 9/2009 | Masuda | H01M 50/489 361/502 |
| 2009/0269672 A1* | 10/2009 | Takita | H01M 50/489 264/51 |
| 2010/0203419 A1* | 8/2010 | Ishikawa | H01M 8/109 429/479 |
| 2013/0143095 A1 | 6/2013 | Takagi et al. | |
| 2017/0141397 A1* | 5/2017 | Lecuyer | H01M 4/382 |
| 2017/0352913 A1* | 12/2017 | Lecuyer | H01M 10/0525 |

FOREIGN PATENT DOCUMENTS

| | | | | |
|---|---|---|---|---|
| CN | 202265532 U | | 6/2012 | |
| CN | 107732293 A | * | 2/2018 | ........ H01M 10/0525 |
| CN | 109638349 A | | 4/2019 | |
| EP | 3 843 194 A1 | | 6/2021 | |
| JP | 2001-176479 A | | 6/2001 | |
| JP | 2001-243988 A | | 9/2001 | |
| JP | 2002-184466 A | | 6/2002 | |
| JP | 2002-265657 A | | 9/2002 | |
| JP | 2007-66808 A | | 3/2007 | |
| JP | 2007-227031 A | | 9/2007 | |
| JP | 2015-153460 A | | 8/2015 | |
| JP | 2017-103146 A | | 6/2017 | |
| JP | 2018-101641 A | | 6/2018 | |
| JP | 2018-113140 A | | 7/2018 | |
| JP | 2018-198131 A | | 12/2018 | |
| KR | 10-2008-0005530 A | | 1/2008 | |
| KR | 10-2009-0031156 A | | 3/2009 | |
| KR | 10-0957302 B1 | | 5/2010 | |
| KR | 10-2012-0101341 | | 9/2012 | |
| KR | 10-1747938 B1 | | 6/2017 | |
| KR | 10-2018-0076949 A | | 7/2018 | |
| KR | 10-2018-0099548 A | | 9/2018 | |

OTHER PUBLICATIONS

European Search Report for Appl. No. 20802764.9 dated Oct. 5, 2021.

Oh, J.S., et al. "Lithium polymer batteries using the highly porous membrane filled with solvent-free polymer electrolyte," Electrochimica Acta, Dec. 1, 2006, vol. 52, No. 4, pp. 1567-1570.

* cited by examiner

SOLID ELECTROLYTE MEMBRANE INCLUDING SOLID ELECTROLYTE MATERIAL FILLED INTO HEAT TREATED POROUS POLYMER SHEET, METHOD FOR MANUFACTURING SAME AND SOLID-STATE BATTERY INCLUDING SAME

TECHNICAL FIELD

The present application claims priority to Korean Patent Application No. 10-2019-0052529 filed on May 3, 2019 in the Republic of Korea. The present disclosure relates to an electrolyte membrane for a solid-state battery, a solid-state battery including the electrolyte membrane and a method for manufacturing the electrolyte membrane.

BACKGROUND ART

A lithium ion battery using a liquid electrolyte has a structure in which a negative electrode and positive electrode are defined by a separator, and thus may cause a short-circuit when the separator is damaged by deformation or external impact, resulting in a risk, such as overheating or explosion. Therefore, it can be said that development of a solid electrolyte capable of ensuring safety is a very important problem in the field of lithium ion secondary batteries.

A lithium secondary battery using a solid electrolyte is advantageous in that it has enhanced safety, prevents leakage of an electrolyte to improve the reliability of a battery, and facilitates manufacture of a thin battery.

However, when forming such a solid electrolyte membrane including a solid electrolyte into a thin film, there is a problem of degradation of mechanical strength. In addition, since a solid electrolyte membrane functions as an ion channel between a positive electrode and a negative electrode, it is still required that the solid electrolyte membrane has high ion conductivity.

DISCLOSURE

Technical Problem

The present disclosure is designed to solve the problems of the related art, and therefore the present disclosure is directed to providing a solid electrolyte membrane having high ion conductivity and high mechanical strength, and a solid-state battery including the same. The present disclosure is also directed to methods for manufacturing the above-mentioned solid electrolyte membrane and solid-state battery including the same. These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a method for manufacturing a solid electrolyte membrane for a solid-state battery according to any one of the following embodiments.

According to the first embodiment of the present disclosure, there is provided a method for manufacturing a solid electrolyte membrane for a solid-state battery, including the steps of:

(S10) preparing a porous polymer sheet;

(S11) fixing the end portion of the porous polymer sheet and carrying out heat treatment;

(S12) disposing a solid electrolyte film including a solid electrolyte material on at least one surface of the heat treated porous polymer sheet to obtain a laminate structure; and (S13) pressurizing the laminate structure so that the heat treated porous polymer sheet is filled with the solid electrolyte material.

According to the second embodiment of the present disclosure, there is provided the method for manufacturing a solid electrolyte membrane for a solid-state battery as defined in the first embodiment, wherein the heat treatment in step (S11) is carried out at a temperature lower than the melting point of the porous polymer sheet in step (S10).

According to the third embodiment of the present disclosure, there is provided the method for manufacturing a solid electrolyte membrane for a solid-state battery as defined in the first or the second embodiment, wherein the heat treatment in step (S11) is carried out at 50-300° C. for 10 minutes to 24 hours.

According to the fourth embodiment of the present disclosure, there is provided the method for manufacturing a solid electrolyte membrane for a solid-state battery as defined in any one of the first to the third embodiments, wherein the porous polymer sheet in step (S10) has a porosity of 20-50 vol % and an average pore diameter of 20-500 nm.

According to the fifth embodiment of the present disclosure, there is provided the method for manufacturing a solid electrolyte membrane for a solid-state battery as defined in any one of the first to the fourth embodiments, wherein the ratio (B/A) of the average pore diameter (B) of the heat treated porous polymer sheet in step (S11) based on the average pore diameter (A) of the porous polymer sheet in step (S10) is 1.1-100.

According to the sixth embodiment of the present disclosure, there is provided the method for manufacturing a solid electrolyte membrane for a solid-state battery as defined in any one of the first to the fifth embodiments, wherein the ratio (D/C) of the porosity (D) of the heat treated porous polymer sheet in step (S11) based on the porosity (C) of the porous polymer sheet in step (S10) is 1.1-3.

According to the seventh embodiment of the present disclosure, there is provided the method for manufacturing a solid electrolyte membrane for a solid-state battery as defined in any one of the first to the sixth embodiments, wherein step (S11) is a step of fixing the end portion of the porous polymer sheet and carrying out heat treatment to obtain a heat treated porous polymer sheet having a larger average pore diameter than the average pore diameter of the porous polymer sheet in step (S10) and a higher porosity than the porosity of the porous polymer sheet in step (S10), and step (S11) is a step of fixing the end portion of the porous polymer sheet, and then carrying out heat treatment in such a manner that the porous polymer sheet has a porosity of 30-90 vol % and a pore diameter of 100 nm to 100 μm.

According to the eighth embodiment of the present disclosure, there is provided the method for manufacturing a solid electrolyte membrane for a solid-state battery as defined in any one of the first to the seventh embodiments, wherein the porous polymer sheet in step (S10) is a polymer film including a polyolefin-based polymer resin, and the polymer film has a thickness of 5-50 μm.

In another aspect of the present disclosure, there is provided a solid electrolyte membrane for a solid-state battery according to any one of the following embodiments.

According to the ninth embodiment of the present disclosure, there is provided a solid electrolyte membrane for a solid-state battery, including a solid electrolyte material and at least one porous polymer sheet, wherein the porous polymer sheet has a porosity of 30-90 vol % and an average pore diameter of 100 nm to 100 μm, and the solid electrolyte material is packed in the pores of the porous polymer sheet to form a composite of the solid electrolyte material with the porous polymer sheet.

According to the tenth embodiment of the present disclosure, there is provided the solid electrolyte membrane for a solid-state battery as defined in the ninth embodiment, wherein the porous polymer sheet has a melting point of 50-300° C.

According to the eleventh embodiment of the present disclosure, there is provided the solid electrolyte membrane for a solid-state battery as defined in the ninth or the tenth embodiment, wherein the porous polymer sheet is a polymer film including a polyolefin-based polymer resin.

According to the twelfth embodiment of the present disclosure, there is provided the solid electrolyte membrane for a solid-state battery as defined in any one of the ninth to the eleventh embodiments, wherein the porous polymer sheet is obtained by heat treatment at a temperature equal to or lower than the melting point thereof.

According to the thirteenth embodiment of the present disclosure, there is provided the solid electrolyte membrane for a solid-state battery as defined in any one of the ninth to the twelfth embodiments, which has a thickness of 15-50 μm and a tensile strength of 100-2,000 kgf/cm².

In still another aspect of the present disclosure, there is provided a solid-state battery including the solid electrolyte membrane as defined in any one of the ninth to the thirteenth embodiments.

Advantageous Effects

The solid electrolyte membrane according to an embodiment of the present disclosure is provided with a porous polymer sheet, and thus has increased mechanical strength. In addition, before the porous polymer sheet is heat treated, the end portion of the porous polymer sheet is fixed and then heat treatment is carried out. Thus, the heat treated porous polymer sheet may have a higher porosity and larger pore diameter as compared to the porous polymer sheet before heat treatment, thereby providing increased ion conductivity. In addition, the solid electrolyte membrane according to an embodiment of the present disclosure includes a composite of a porous polymer sheet with a solid electrolyte material, and thus has excellent strength and can be formed into a thin film having a thickness of 50 μm or less to provide a battery with improved energy density advantageously.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Figure 1:
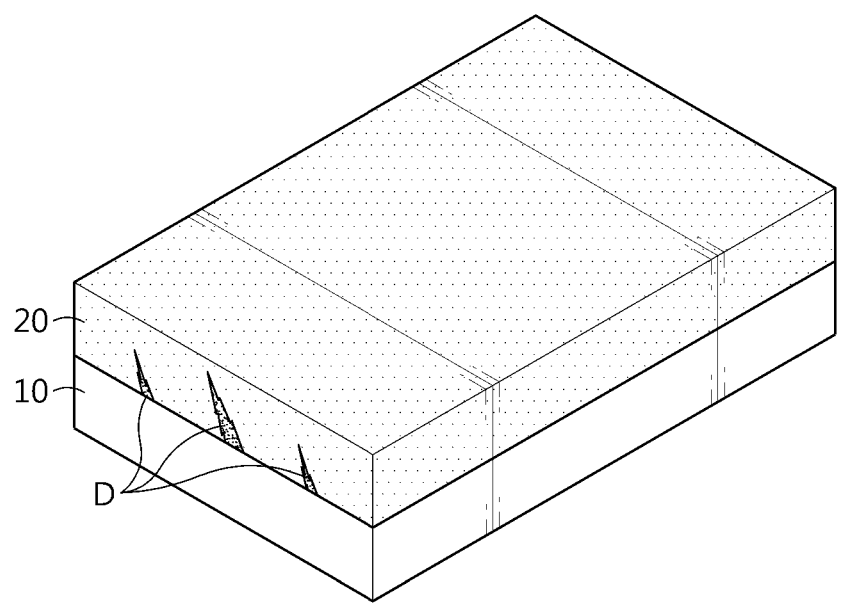
FIG. 1 is a schematic sectional view illustrating a conventional solid electrolyte membrane.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part [includes] an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

The present disclosure relates to a method for manufacturing a solid electrolyte membrane for a solid-state battery. The present disclosure also relates to a solid electrolyte membrane obtained by the method and a solid-state battery including the same. The solid-state battery according to the present disclosure includes a solid electrolyte material packed in a heat treated polymer sheet, and thus the solid electrolyte membrane may be formed into a thin film having a thickness of about 50 μm or less, and have high ion conductivity and increased energy density. In addition, the solid-state battery according to the present disclosure is provided with a porous polymer sheet and has increased mechanical strength, and thus the solid electrolyte membrane is less damaged by lithium dendrite.

Figure 2:
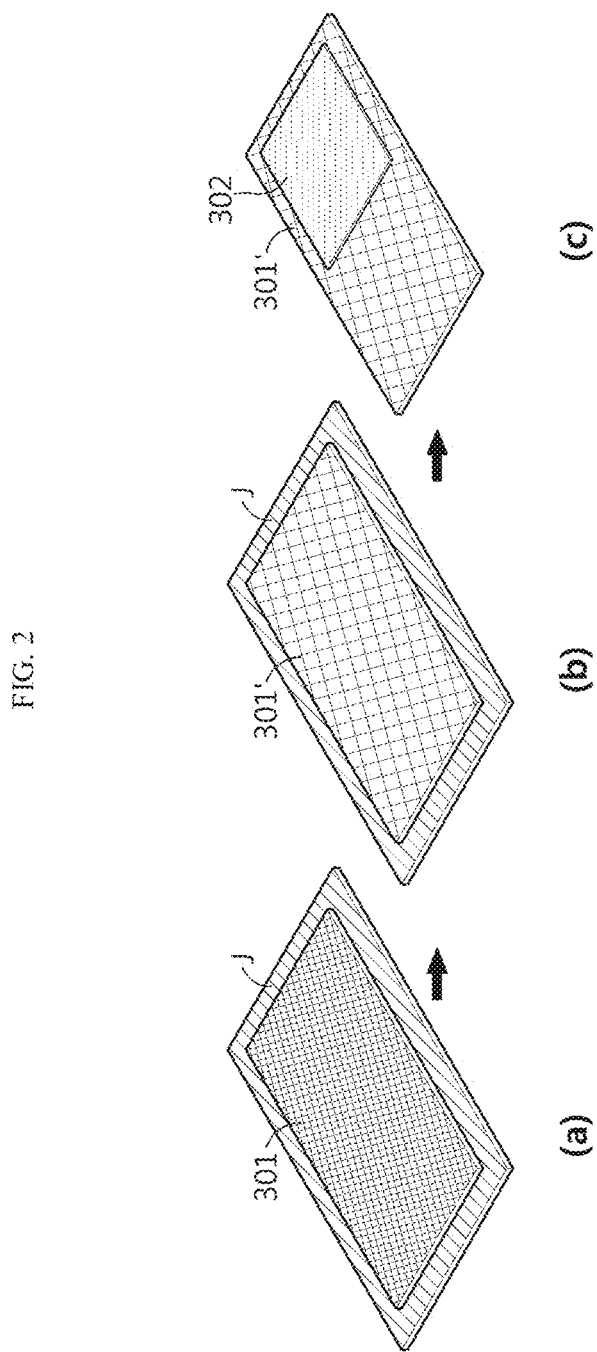
FIG. 2 is a schematic flow chart illustrating the method for manufacturing a solid electrolyte membrane according to an embodiment of the present disclosure.

FIG. 1 is a schematic sectional view illustrating a conventional solid electrolyte membrane. FIG. 2 is a schematic flow chart illustrating the method for manufacturing a solid electrolyte membrane according to an embodiment of the present disclosure. Hereinafter, the present disclosure will be explained in more detail with reference to the accompanying drawings.

Referring to FIG. 1, when the solid electrolyte membrane is controlled to have a thickness of about 100 μm in order to increase its mechanical strength, energy density is reduced and processability is degraded. In addition, even when the thickness is increased, the solid electrolyte membrane 20 itself has low strength, and thus the membrane itself is damaged by lithium dendrite D formed from the negative electrode 10, resulting in a short-circuit undesirably.

To solve the above-mentioned problem, the inventors of the present disclosure have conducted intensive studies about formation of a composite of a porous polymer sheet with a solid electrolyte material.

However, a conventional polymer sheet has a low porosity of 20-50 vol % and a small average pore diameter of 20-500 nm, thereby making it difficult to manufacture a composite. In this case, even when a solid electrolyte is packed in the polymer sheet, it is not possible to realize high ion conductivity.

To solve the above-mentioned problem, the solid electrolyte membrane for a solid-state battery according to an embodiment of the present disclosure includes a solid electrolyte material and a porous polymer sheet having a plurality of pores, wherein the pores of the polymer sheet are filled with the solid electrolyte material.

Particularly, the porous polymer sheet has a porosity of 30-90 vol % and a pore diameter of 100 nm to 100 μm.

In other words, unlike the conventional porous polymer sheet, the porous polymer sheet according to an embodiment of the present disclosure has a high porosity and large pore diameter. Therefore, the content of the solid electrolyte material packed in the pores of the porous sheet is increased to improve ion conductivity. In addition, since the polymer sheet is used, it is possible to obtain high mechanical strength.

According to an embodiment of the present disclosure, there is provided a solid electrolyte membrane for a solid-state battery which is subjected to a heat treatment step after fixing the porous polymer sheet, and thus has increased mechanical strength and increased ion conductivity.

Figure 3:
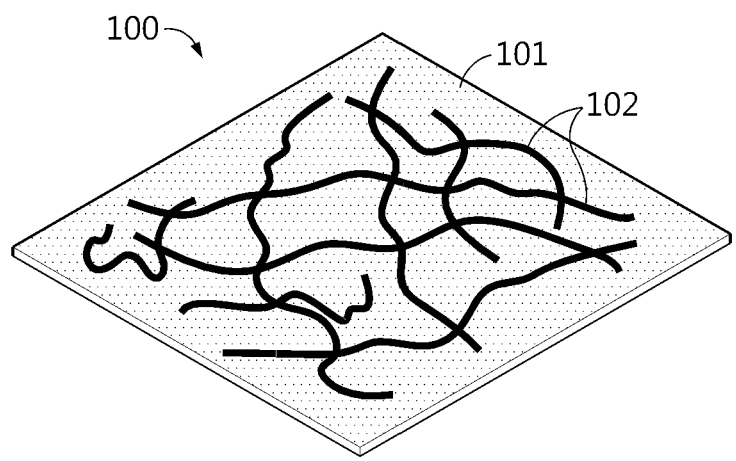
FIG. 3 is a schematic sectional view illustrating the solid electrolyte membrane according to an embodiment of the present disclosure.

In one aspect of the present disclosure, there is provided a solid electrolyte membrane 100 for a solid-state battery, including a solid electrolyte material and at least one porous polymer sheet, wherein the porous polymer sheet has a porosity of 30-90 vol % and an average pore diameter of 100 nm to 100 μm, and the solid electrolyte material 102 is packed in the pores of the porous polymer sheet 101 to form a composite of the solid electrolyte material with the porous polymer sheet. FIG. 3 is a schematic view illustrating the solid electrolyte membrane.

The porous polymer sheet is a porous material including a plurality of pores, and includes a polymer resin. The porous polymer sheet according to an embodiment of the present disclosure may be obtained by heat treatment at a temperature equal to or lower than the melting point of the porous polymer sheet. For example, the porous polymer sheet may be heat treated at 50-300° C., 70-250° C., or 100-200° C.

Therefore, the solid electrolyte membrane according to an embodiment of the present disclosure is provided with a porous polymer sheet having a larger average pore diameter and higher porosity as compared to the porous polymer sheet before heat treatment. Thus, it is possible to facilitate packing with a solid electrolyte.

According to the present disclosure, the inner part of the heat treated porous polymer sheet may have an open-cell structure in which a plurality of pores having large pore diameter and high porosity is interconnected. In other words, the pores are interconnected so that a flowable material may pass from one surface of the substrate to the other surface of the substrate. As a result, lithium ions can move more smoothly between the positive electrode and the negative electrode of a battery.

According to an embodiment of the present disclosure, the porous polymer sheet may have a porosity of 30-90 vol %, 40-80 vol %, or 50-70 vol %.

According to an embodiment of the present disclosure, the porous polymer sheet may have an average pore diameter of 100 nm to 100 μm, 500 nm to 10 μm, or 1 μm to 5 μm.

Since the heat treated porous polymer sheet has such a large average pore diameter and such a high porosity, it is possible to increase the ion conductivity by about 10% or more as compared to the porous polymer sheet before heat treatment.

According to an embodiment of the present disclosure, the porous polymer sheet may be a polymer film including a polyolefin-based polymer resin. In the case of a polyolefin-based polymer film, it is shrunk, when it is subjected to heat treatment. Therefore, when heat treatment is carried out after the end portion of the film is fixed, it is possible to obtain a polymer film having a larger pore size as compared to the film before heat treatment. On the contrary, when using a non-woven web, there is a small change in pore size before and after heat treatment. Thus, such a non-woven web is not suitable for a porous polymer sheet according to an embodiment of the present disclosure.

Herein, the polyolefin-based polymer resin may include polyethylene, polypropylene, polybutene, polypentene, or two or more of them.

According to an embodiment of the present disclosure, the porous polymer sheet may have a melting point of 50-300° C. When the porous polymer sheet is heat treated at a temperature lower than the melting point of the polymer sheet, it can have a desired pore size and porosity according to the present disclosure.

According to an embodiment of the present disclosure, the porous polymer sheet may have a thickness of about 5-50 μm. Within the above-defined range, it is possible to obtain a desired level of strength of the solid electrolyte membrane and to accomplish high energy density.

According to the present disclosure, the solid electrolyte material is packed in the pores of the porous polymer sheet to form a composite of the solid electrolyte material with the porous polymer sheet.

According to the present disclosure, the solid electrolyte material is obtained by forming a solid electrolyte including a solid electrolyte material into the shape of a film and pressing the film into the porous polymer sheet. Since the solid electrolyte material is pressed in the form of a film into the porous polymer sheet, it is possible to reduce dead spaces in the solid electrolyte membrane.

According to an embodiment of the present disclosure, a solid electrolyte material having excellent reduction stability is used preferably as a solid electrolyte material. Since the solid electrolyte material mainly functions to transport lithium ions according to the present disclosure, any solid electrolyte material having a high ion conductivity, such as $10^{-5}$ S/cm or more, preferably $10^{-4}$ S/cm or more may be used with no particular limitation.

Herein, the solid electrolyte material may be a polymeric solid electrolyte formed by adding a polymer resin to a solvated electrolyte salt, or a polymeric gel electrolyte formed by impregnating a polymer resin with an organic electrolyte containing an organic solvent and an electrolyte salt, ionic liquid, monomer, oligomer, or the like. The solid electrolyte material may also be a sulfide-based solid electrolyte having high ion conductivity or an oxide-based solid electrolyte having excellent stability.

According to an embodiment of the present disclosure, particular examples of the polymeric solid electrolyte include polyether polymer, polycarbonate polymer, acrylate polymer, polysiloxane polymer, phosphazene polymer, polyethylene derivatives, alkylene oxide derivatives, such as polyethylene oxide, phosphate polymer, polyagitation lysine, polyester sulfide, polyvinyl alcohol, polyvinylidene fluoride, a polymer containing an ionically dissociable group, or the like.

Particular examples of the polymeric solid electrolyte include a branched copolymer including polyethylene oxide (PEO) backbone copolymerized with a comonomer including an amorphous polymer, such as PMMA, polycarbonate, polydiloxane (pdms) and/or phosphazene, comb-like polymer, a crosslinked polymer resin, or a mixture thereof.

In addition, the polymeric gel electrolyte includes an electrolyte salt-containing organic electrolyte and polymer resin, wherein the organic electrolyte is present in an amount of 60-400 parts by weight based on the weight of the polymer resin. The polymer applied to the gel electrolyte is not particularly limited, and particular examples of the polymer include polyether, PVC, PMMA, polyacrylonitrile (PAN), polyvinylidene fluoride (PVdF), poly(vinylidene fluoride-hexafluoropropylene) (PVdF-HFP), or a mixture thereof.

Further, the electrolyte salt may be an ionizable lithium salt represented by $Li^+X^-$. Preferably, such a lithium salt may be any one selected from the group consisting of LiTFSI, LiCl, LiBr, LiI, $LiClO_4$, $LiBF_4$, $LiB_{10}Cl_{10}$, $LiPF_6$, $LiAsF_6$, $LiSbF_6$, $LiAlCl_4$, LiSCN, $LiCF_3CO_2$, $LiCH_3SO_3$, $LiCF_3SO_3$, $LiN(SO_2CF_3)_2$, $LiN(SO_2C_2F_5)_2$, $LiC_4F_9SO_3$, $LiC(CF_3SO_2)_3$, $(CF_3SO_2)\cdot 2NLi$, lithium chloroborate, lower aliphatic lithium carboxylate, lithium tetraphenyl borate, imides and a combination thereof. More preferably, the lithium salt may be LiTFSI (lithium bistrifluoromethanesulfonimide).

According to an embodiment of the present disclosure, the sulfide-based solid electrolyte includes Li, X and S, wherein X may include P, Ge, B, Si, Sn, As, Cl, F, I, or two or more of them.

According to an embodiment of the present disclosure, the oxide-based solid electrolyte includes Li, A and O, wherein A may include La, Zr, Ti, Al, P, I, or two or more of them.

According to an embodiment of the present disclosure, the solid electrolyte membrane has a thickness of about 50 μm or less, preferably about 15-50 μm. The solid electrolyte membrane may have an adequate thickness within the above-defined range, considering ion conductivity, physical strength, energy density of a battery to which the solid electrolyte membrane is applied, or the like. For example, in terms of ion conductivity or energy density, the thickness may be 10 μm or more, 20 μm or more, or 30 μm or more. Meanwhile, in terms of physical strength, the thickness may be 50 μm or less, 45 μm or less, or 40 μm or less. In addition, the solid electrolyte membrane may have a tensile strength of about 1,000-2,000 kgf/cm², while it has the above-defined range of thickness. Further, the solid electrolyte membrane may have a porosity of 15 vol % or less, or about 10 vol % or less. Thus, the solid electrolyte membrane according to the present disclosure may have high mechanical strength, even though it is a thin film.

According to an embodiment of the present disclosure, the solid electrolyte membrane may be obtained by preparing an electrolyte film by using a polymeric electrolyte material, disposing the electrolyte film on the surface of the polymer sheet, and carrying out pressurization in such a manner that the electrolyte film may be pressed into the polymer sheet and the pores of the polymer sheet may be filled with the polymeric electrolyte.

Hereinafter, the method for manufacturing a solid electrolyte membrane according to an embodiment of the present disclosure will be explained in detail with reference to FIG. 2.

First, a porous polymer sheet 301 is prepared (S10, FIG. 2a). The porous polymer sheet may be a polymer film including a polyolefin-based polymer resin, and the polymer film may have a thickness of 5-100 μm. The porous polymer sheet in step (S10) may have a low porosity of 20-50 vol % and a small pore diameter of 20-500 nm.

The porous polymer sheet may be a polymer film formed by melting, extruding and orienting a polymer material through a dry process, or a polymer film obtained by extracting a plasticizer through a wet process to form pores, and may be provided in a film-formation-finished state.

Next, the end portion of the formed porous polymer sheet is fixed and heat treatment is carried out (S11). Herein, as shown in FIG. 2, the end portion may be fixed by using a separator coupling jig J. The method for fixing the end portion of the porous polymer sheet is not particularly limited, as long as it can fix the porous polymer sheet to be thermally shrunk by heat treatment. In the porous polymer sheet in step (S10), residual stress still remains even after film formation. In other words, the porous polymer sheet elongated by orientation has a property of returning to its original size or shape. When the porous polymer sheet having residual stress is heat treated in step (S11), the residual stress in the exposed porous polymer sheet is relieved by heat and heat shrinking is started. Meanwhile, since the end portion of the porous polymer sheet is fixed and then heat treatment is carried out in step (S11) according to the present disclosure, it is possible to provide a porous polymer sheet having a high porosity and a large average pore diameter. The heat treated porous polymer sheet 301' is shown in FIG. 2b.

If the end portion of the porous polymer sheet is not fixed, the porosity and pore diameter may be reduced by simple thermal shrinking of the sheet, as compared to the porous polymer sheet before heat treatment. However, since the end portion is fixed and then heat treatment is carried out according to the present disclosure, the resultant porous polymer sheet may have a porosity of 30-90 vol % and a pore diameter of 100 nm to 100 μm.

Herein, the heat treatment in step (S11) may be carried out at a temperature lower than the melting point of the porous polymer sheet in step (S10).

Particularly, the heat treatment in step (S11) may be carried out at 50-300° C., 100-200° C., or 120-150° C.

In addition, the heat treatment may be carried out for a time within a range of 10 minutes to 24 hours, 30 minutes to 12 hours, or 1 hour to 6 hours.

When the heat treatment is carried out within the above-defined ranges of temperature and time, the pore portions in the sheet may be molten after the heat treatment, and the porosity and pore diameter may be increased by fixing the end portion.

According to an embodiment of the present disclosure, the ratio (B/A) of the average pore diameter (B) of the heat treated porous polymer sheet in step (S11) based on the average pore diameter (A) of the porous polymer sheet in step (S10) may be 1.1-100, 2-50, or 5-10.

According to an embodiment of the present disclosure, the ratio (D/C) of the porosity (D) of the heat treated porous polymer sheet in step (S11) based on the porosity (C) of the porous polymer sheet in step (S10) may be 1.1-3, 1.2-2.5, or 1.5-2.

As the solid electrolyte material is pressed into the porous polymer sheet having a higher porosity and a larger pore diameter as compared to the porous polymer sheet in step (S10), it is possible to provide higher ion conductivity.

Herein, the heat treatment may be carried out under air within the above-defined ranges of temperature and time.

According to an embodiment of the present disclosure, step (S11) is a step of fixing the end portion of the porous polymer sheet and carrying out heat treatment to obtain a heat treated porous polymer sheet having a larger average pore diameter than the average pore diameter of the porous polymer sheet in step (S10) and a higher porosity than the porosity of the porous polymer sheet in step (S10), and step (S11) is a step of fixing the end portion of the porous polymer sheet, and then carrying out heat treatment in such a manner that the porous polymer sheet may have a porosity of 30-90 vol % and a pore diameter of 100 nm to 100 µm.

Then, a solid electrolyte film 302 including a solid electrolyte material is disposed on at least one surface of the heat treated porous polymer sheet 301' to obtain a laminate structure (S12, FIG. 2c).

Herein, the solid electrolyte film including a solid electrolyte material may be prepared in the following manner. A solid electrolyte material is mixed with a solvent to prepare slurry for forming a solid electrolyte film. The solvent may be selected suitably depending on the solid electrolyte material to be used. For example, when an alkylene oxide-based electrolyte, such as polyethylene oxide (PEO), is used as a solid polymeric material, acetonitrile may be used as a solvent. According to an embodiment of the present disclosure, the slurry may have a solid content of about 5-15 wt %. Herein, the slurry may be present at room temperature or may be warmed to a temperature of 40-60° C. to accelerate homogeneous mixing of the solvent with the polymeric electrolyte.

Next, the slurry is applied to a release sheet, such as a terephthalate film, and molded into the shape of a film having a desired thickness. The application and molding may be carried out by using a known coating process, such as doctor blade coating. Then, the molded film is dried to remove the solvent and to obtain an electrolyte film.

The obtained solid electrolyte film is disposed on at least one surface of the heat treated porous polymer sheet to obtain a laminate structure.

According to the related art, slurry containing a solid electrolyte material dispersed in a solvent has been used. However, since a solid-state battery uses no liquid electrolyte, pores formed by evaporation of the solvent function as resistance. However, according to the present disclosure, a solid electrolyte film is used instead of such solid electrolyte slurry. In other words, since a solid electrolyte film in which solvent is dried is used, it is possible to prevent formation of pores that may function as resistance. In addition, the solid electrolyte film can be handled with ease.

Finally, the laminate structure in step (S12) is pressurized so that the heat treated porous polymer sheet may be filled with the solid electrolyte material, thereby forming a composite of the solid electrolyte material with the porous polymer sheet (S13).

The pressurization may be carried out by using at least one device, such as a roll press, uniaxial press or a jig. Herein, it is possible to provide the electrolyte membrane with a suitable thickness and/or porosity by controlling the processing conditions, such as a press, roller, jig interval, applied pressure and temperature. Herein, the pressurization member may be further provided with a separate heating member so that the surface of the member facing the electrolyte film may be heated. When the electrolyte film is heated by the pressurization member in the above-mentioned manner and has increased softness, it is possible to press the electrolyte film well into the sheet even under a relatively low pressure condition.

Meanwhile, according to an embodiment of the present disclosure, the electrolyte film may be warmed to room temperature (25° C.) to 180° C., before it is introduced to the press-fitting process after its preparation, in order to increase the softness of the material and to accelerate introduction of the electrolyte film into the pores of the polymer sheet. The warming method is not limited to a particular method, but may be carried out by allowing the film to stand in an oven warmed to a predetermined temperature for several hours.

In another aspect of the present disclosure, there is provided a solid-state battery including the above-described solid electrolyte membrane. The solid-state battery includes a positive electrode, a negative electrode and a solid electrolyte membrane.

According to the present disclosure, each of the positive electrode and the negative electrode may include a current collector and an electrode active material layer formed on at least one surface of the current collector, wherein the electrode active material layer may include a plurality of electrode active material particles and a solid electrolyte. In addition, the electrode active material layer may further include at least one of a conductive material and a binder resin, if necessary. Additionally, the electrode active material layer may further include various additives in order to supplement or improve the physicochemical properties of the electrode.

According to the present disclosure, in the case of a negative electrode active material, any material used conventionally as a negative electrode active material for a lithium ion secondary battery may be used. For example, the negative electrode active material may include at least one selected from: carbon such as non-graphitizable carbon, graphitic carbon, or the like; metal composite oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb or Ge; Me': Al, B, P, Si, an element of Group 1, Group 2 or Group 3 in the Periodic Table, or halogen, $0 < x \leq 1$; $1 \leq y \leq 3$; $1 \leq z \leq 8$); lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, or the like; conductive polymers such as polyacetylene; Li—Co—Ni based materials; titanium oxide; and lithium titanium oxide, or the like. According to an embodiment of the present disclosure, the negative electrode active material may include a carbonaceous material and/or Si.

In the case of a positive electrode, the electrode active material may be any material used conventionally as a positive electrode active material for a lithium ion secondary battery. For example, the positive electrode active material may include, but are not limited to: layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x=0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x=0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); lithium manganese composite oxides having a spinel structure and represented by the formula of $LiNi_xMn_{2-x}O_4$; $LiMn_2O_4$ in which Li is partially substituted with an alkaline earth metal ion; disulfide compounds; $Fe_2(MoO_4)_3$; or the like.

According to the present disclosure, the current collector includes a metal plate having electrical conductivity and may be one selected suitably depending on polarity of electrodes known in the field of secondary batteries.

According to the present disclosure, the conductive material is added generally in an amount of 1-30 wt % based on the total weight of the mixture including the electrode active material. The conductive material is not particularly limited, as long as it causes no chemical change in the corresponding battery and has conductivity. For example, the conductive material include any one selected from: graphite, such as natural graphite or artificial graphite; carbon black, such as carbon black, acetylene black, KETJENBLACK™, channel black, furnace black, lamp black or thermal black; conductive fibers, such as carbon fibers or metallic fibers; metal powder, such as carbon fluoride, aluminum or nickel powder; conductive whisker, such as zinc oxide or potassium titanate; conductive metal oxide, such as titanium oxide; and conductive materials, such as polyphenylene derivatives, or a mixture of two or more of them.

According to the present disclosure, the binder resin is not particularly limited, as long as it is an ingredient which assists binding of the electrode active material with the conductive material, and binding to the current collector. Particular examples of the binder resin include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluororubber, various copolymers, or the like. In general, the binder resin may be used in an amount of 1-30 wt %, or 1-10 wt %, based on 100 wt % of electrode active material layer.

Meanwhile, according to the present disclosure, the electrode active material layer may include at least one additive, such as an oxidation stabilizing additive, reduction stabilizing additive, flame retardant, heat stabilizer, anti-fogging agent, or the like, if necessary.

According to the present disclosure, the solid electrolyte material may include at least one of a polymeric solid electrolyte, oxide-based solid electrolyte and a sulfide-based solid electrolyte.

According to the present disclosure, different solid electrolytes may be used for the positive electrode, negative electrode and the solid electrolyte membrane, or the same solid electrolyte may be used for two or more battery elements. For example, in the case of a positive electrode, a polymeric electrolyte having excellent oxidation stability may be used as a solid electrolyte. In addition, in the case of a negative electrode, a polymeric electrolyte having excellent reduction stability is used preferably as a solid electrolyte. However, the scope of the present disclosure is not limited thereto. Since the solid electrolyte mainly functions to transport lithium ions in the electrode, any material having a high ion conductivity, such as $10^{-7}$ s/cm or more, or $10^{-6}$ s/cm or more, may be used with no particular limitation.

According to the present disclosure, the polymeric electrolyte may be a solid polymeric electrolyte formed by adding a polymer resin to a solvated lithium salt, or a polymeric gel electrolyte formed by impregnating a polymer resin with an organic electrolyte containing an organic solvent and a lithium salt.

Herein, reference will be made to the above description of the solid electrolyte membrane about the polymeric electrolyte.

The sulfide-based solid electrolyte contains sulfur (S), has conductivity of metal ions that belong to Group 1 or Group 2 in the Periodic Table, and may include Li—P—S glass or Li—P—S glass ceramic. Non-limiting examples of the sulfide-based solid electrolyte may include at least one of $Li_2S$—$P_2S_5$, $Li_2S$—$LiI$—$P_2S_5$, $Li_2S$—$LiI$—$Li_2O$—$P_2S_5$, $Li_2S$—$LiBr$—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SnS$, $Li_2S$—$P_2S_5$—$Al_2S_3$, $Li_2S$—$GeS_2$, $Li_2S$—$GeS_2$—$ZnS$, or the like.

In addition, the oxide-based solid electrolyte contains oxygen (O) and has conductivity of metal ions that belong to Group 1 or Group 2 in the Periodic Table. Non-limiting examples of the oxide-based solid electrolyte may include at least one of LLTO compounds, $Li_6La_2CaTa_2O_{12}$, $Li_6La_2ANb_2O_{12}$ (wherein A is Ca or Sr), $Li_2Nd_3TeSbO_{12}$, $Li_3BO_{2.5}N_{0.5}$, $Li_9SiAlO_8$, LAGP compounds, LATP compounds, $Li_{1+x}Ti_{2-x}Al_xSi_y(PO_4)_{3-y}$ (wherein $0 \leq x \leq 1$, $0 \leq y \leq 1$), $LiAl_xZr_{2-x}(PO_4)_3$ (wherein $0 \leq x \leq 1$, $0 \leq y \leq 1$), $LiTi_xZr_{2-x}(PO_4)_3$ (wherein $0 \leq x \leq 1$, $0 \leq y \leq 1$), LISICON compounds, LIPON compounds, perovskite compounds, NASICON compounds and LLZO compounds.

In still another aspect of the present disclosure, there is provided a secondary battery having the above-described structure. There are also provided a battery module including the secondary battery as a unit cell, a battery pack including the battery module, and a device including the battery pack as a power source. Herein, particular examples of the device may include, but are not limited to: power tools driven by an electric motor; electric cars, including electric vehicles (EV), hybrid electric vehicles (HEV), plug-in hybrid electric vehicles (PHEV), or the like; electric carts, including electric bikes (E-bikes) and electric scooters (E-scooters); electric golf carts; electric power storage systems; or the like.

Examples will be described more fully hereinafter so that the present disclosure can be understood with ease. However, the following examples are for illustrative purposes only and the scope of the present disclosure is not limited thereto.

Preparation Example 1

First, a polyethylene porous polymer sheet (porosity: 37 vol %, pore diameter: 43 nm) having a thickness of 6.8 μm was prepared.

Next, the end portion of the porous polymer sheet was fixed by using a jig and the porous polymer sheet was subjected to heat treatment in an oven at 120° C. for 30 minutes. The heat treated porous polymer sheet had a porosity of 45 vol % and a pore diameter of 96 nm.

Preparation Example 2

A porous polymer sheet was prepared in the same manner as Preparation Example 1, except that the porous polymer sheet was subjected to heat treatment in an oven at 120° C. for 1 hour.

Preparation Example 3

A porous polymer sheet was prepared in the same manner as Preparation Example 1, except that the porous polymer sheet was subjected to heat treatment in an oven at 150° C. for 30 minutes.

Preparation Example 4

A polyethylene porous polymer sheet (porosity: 37 vol %, pore diameter: 43 nm) having a thickness of 6.8 μm was prepared. In other words, the porous polymer sheet according to Preparation Example 4 was not subjected to an additional heat treatment process.

Preparation Example 5

A porous polymer sheet was prepared in the same manner as Preparation Example 1, except that the porous polymer sheet was subjected to heat treatment, while the end portion of the porous polymer sheet was not fixed.

The physical properties of each of the porous polymer sheets according to Preparation Examples 1-5 are shown in the following Table 1.

Example 1

First, polyethylene oxide (PEO, Mw 600,000) was prepared and mixed with LiTFSI to obtain a solid electrolyte material. The solid electrolyte material was prepared by mixing PEO with LiTFSI at a molar ratio ([EO]/[Li$^+$]=9:1). The solid electrolyte material was agitated with acetonitrile at 60° C. overnight to prepare slurry for forming a solid electrolyte film having a concentration of about 10 wt %. Next, the slurry for forming a solid electrolyte film was applied to a terephthalate release film by using a doctor blade at room temperature and dried naturally at room temperature to obtain a solid electrolyte film having a thickness of about 50 μm.

Then, the prepared solid electrolyte film was disposed on one surface of the heat treated porous polymer sheet heat treated obtained from Preparation Example 1 to obtain a laminate structure. The laminate structure was introduced to a roll press and pressurization was carried out three time, while the gap between rolls were reduced sequentially. In this manner, the solid electrolyte film was pressed into the pores of the heat treated porous polymer sheet. Finally, a solid electrolyte membrane for a solid-state battery having a thickness of about 20 μm was obtained.

Example 2

A solid electrolyte membrane was obtained in the same manner as Example 1, except that the heat treated porous polymer sheet obtained from Preparation Example 2 was used and the solid electrolyte membrane was controlled to a thickness of 50 μm.

Example 3

A solid electrolyte membrane was obtained in the same manner as Example 1, except that the heat treated porous polymer sheet obtained from Preparation Example 3 was used. The resultant solid electrolyte membrane had a thickness of 20 μm.

Comparative Example 1

A solid electrolyte membrane was obtained in the same manner as Example 1, except that the porous polymer sheet obtained from Preparation Example 4 was used and the solid electrolyte membrane was controlled to a thickness of 50 μm.

Comparative Example 2

First, polyethylene oxide (PEO, Mw 600,000) was prepared and mixed with LiTFSI to obtain a solid electrolyte material. The solid electrolyte material was prepared by mixing PEO with LiTFSI at a molar ratio ([EO]/[Li$^+$]=9:1). The solid electrolyte material was agitated with acetonitrile at 60° C. overnight to prepare slurry for forming a solid electrolyte film having a concentration of about 10 wt %. Next, the slurry for forming a solid electrolyte film was applied to a terephthalate release film by using a doctor blade at room temperature and dried naturally at room temperature to obtain a solid electrolyte film having a thickness of about 50 μm.

In other words, Comparative Example 2 is a solid electrolyte membrane using no porous polymer sheet.

Comparative Example 3

A solid electrolyte membrane was obtained in the same manner as Example 1, except that the heat treated porous polymer sheet obtained from Preparation Example 5 was used.

Methods for Determining Physical Properties
Determination of Average Pore Diameter The average pore diameter of each of the porous polymer sheets or solid electrolyte membranes was determined by using a capillary flow porometer.

Pore diameters were measured at least three times and the average thereof was calculated.

Determination of Porosity

Each of the porous polymer sheets or solid electrolyte membranes obtained from the above Preparation Examples, Examples and Comparative Examples was cut into a size of 2.834 cm$^2$ and the weight and volume thereof were measured (apparent density was determined), and the apparent density was compared with a designed value (true density) to calculate porosity. In other words, the true density of each of the porous polymer sheets or solid electrolyte membrane was calculated from the compositional ratio of the ingredients contained in each of the porous polymer sheets or solid electrolyte membranes and the density of each ingredient, and then porosity was calculated from the difference between the apparent density and the true density.

Determination of Thickness

The thickness of each of the porous polymer sheets or solid electrolyte membranes obtained from the above Preparation Examples, Examples and Comparative Examples was determined by using Mauser.

Determination of Air Permeability

A system for determining air permeability was used to determine the time required for 100 mL of air to pass through each of the porous polymer sheets or solid electrolyte membranes.

Determination of Ion Resistance

Each of the solid electrolyte membranes according to Examples and Comparative Examples was cut into a size of 1.1761 cm². Then, the solid electrolyte membrane was interposed between two sheets of stainless steel (SUS) to obtain a coin cell. The electrochemical impedance of the coin cell was determined by using an impedance analyzer (VMP3, Bio logic science instrument) at 60° C. under the conditions of an amplitude of 10 mV and a scan range from 500 kHz to 0.1 mHz.

Determination of Tensile Strength

Each of the solid electrolyte membranes according to Examples and Comparative Examples was cut into a size of 15 mm×50 mm. To minimize damages of the solid electrolyte membrane caused by tweezers, a tape was adhered to both ends of each sample, and tensile strength was determined by using a UTM device.

Determination of Discharge Capacity

First, a positive electrode was obtained as follows. NCM811 ($LiNi_{0.8}Co_{0.1}Mn_{0.1}O_2$) as an electrode active material, vapor grown carbon fibers (VGCF) as a conductive material, and a polymeric solid electrolyte (PEO+LiTFSI, molar ratio of PEO:LiTFSI=9:1) were mixed at a weight ratio of 80:3:17, and the resultant mixture was introduced to acetonitrile, followed by agitation, to provide electrode slurry. The electrode slurry was applied to an aluminum current collector having a thickness of 20 μm by using a doctor blade, and the resultant product was vacuum-dried at 120° C. for 4 hours. Then, pressing was carried out by using a roll press to obtain an electrode having an electrode loading amount 2 mAh/cm², an electrode layer thickness of 48 μm and a porosity of 22 vol %.

Then, the positive electrode obtained as described above was cut into a circular shape having an area of 1.4875 cm². In addition, lithium metal foil cut into a circular shape having an area of 1.7671 cm² was prepared as a counter electrode. Each of the solid electrolyte membranes obtained from Examples and Comparative Examples was interposed between the positive electrode and the counter electrode to obtain a coin-type half-cell.

Each solid-state battery obtained as described was subjected to charge/discharge at 60° C. and 0.05 C to evaluate the initial discharge capacity.

Charge condition: constant current (CC)/constant voltage (CV), (4.15V, 0.005 C current cut-off)

Discharge condition: constant current (CC) 3V, (0.05 C)

TABLE 1

| | Average pore diameter (A) of porous polymer sheet in step (S10) | Average pore diameter (B) of porous polymer sheet in step (S11) | Diameter ratio (B/A) | Porosity (C) of porous polymer sheet in step (S10) (vol %) | Porosity (D) of porous polymer sheet in step (S11) (vol %) | Porosity ratio (D/C) | Thickness of porous polymer sheet in step (S11) (μm) | Air permeability of porous polymer sheet in step (S11) (s/100 mL) |
|---|---|---|---|---|---|---|---|---|
| Prep. Ex. 1 | 43 nm | 96 nm | 2.23 | 37 | 45 | 1.21 | 6.3 | 106 |
| Prep. Ex. 2 | 43 nm | 125 nm | 2.91 | 37 | 58 | 1.57 | 6 | 78 |
| Prep. Ex. 3 | 43 nm | 138 nm | 3.21 | 37 | 62 | 1.68 | 5.9 | 72 |
| Prep. Ex. 4 | 43 nm | — | — | 37 | — | — | 6.8 | 165 |
| Prep. Ex. 5 | 43 nm | 36 nm | 0.84 | 37 | 28 | 0.76 | 6.7 | 218 |

As shown in Table 1, when the end portion of the porous polymer sheet in step (S10) is fixed and then heat treatment is carried out, both the porosity and average pore diameter are increased. It can be seen from the porosity and average pore diameter of the porous polymer sheet in step (S11). In addition, the porous polymer sheet in step (S11) has a significantly improved air permeability, as compared to the porous polymer sheet before heat treatment. Particularly, it is possible to control the porosity, average pore diameter and thickness of the resultant porous polymer sheet in step (S11) by controlling heat treatment temperature and heat treatment time, as can be seen from Preparation Examples 1-3.

On the contrary, in the case of Preparation Example 5, when heat treatment is carried out, while the end portion of the porous polymer sheet in step (S10) is not fixed, the porosity and average pore diameter are reduced. It is thought that this is because the total dimension is reduced, while the residual stress in the porous polymer sheet is relieved by the heat energy applied thereto.

TABLE 2

| | Thickness of solid electrolyte membrane (μm) | Ionic resistance of solid electrolyte membrane (ohm) | Tensile strength of solid electrolyte membrane (kgf/cm²) | Discharge capacity of solid electrolyte membrane (mAh/g @ 4.0 V) |
|---|---|---|---|---|
| Ex. 1 | 20 | 14 | 724 | — |
| Ex. 2 | 50 | 38 | 543 | — |
| Ex. 3 | 20 | 12 | 665 | 137 |
| Comp. Ex. 1 | 50 | 45 | 607 | 112 |
| Comp. Ex. 2 | 50 | 25 | 407 | 126 |
| Comp. Ex. 3 | 50 | 53 | 632 | — |

As can be seen from Table 2, Examples 1-3 show reduced ionic resistance as compared to Comparative Example 1. It is thought that this is because the heat treated porous polymer sheet having an increased porosity and average pore diameter is used to facilitate impregnation with the solid electrolyte and to increase the impregnation amount.

Particularly, Example 3 shows increased tensile strength, even though the solid electrolyte membrane is formed into a thin film, and also shows reduced ionic resistance, thereby providing an effect of improving discharge capacity.

Meanwhile, when the end portion of the porous polymer sheet is not fixed, like in the case of Comparative Example 3, it is not possible to increase the pore size in the porous polymer sheet through heat treatment. In this case, the pore size in the porous polymer sheet is rather reduced through heat treatment. As a result, it is difficult to impregnate the solid electrolyte membrane with the solid electrolyte material, resulting in an increase in resistance. Also, the solid electrolyte membrane cannot provide increased tensile strength.

DESCRIPTION OF DRAWING NUMERALS

10: Lithium metal negative electrode
20: Solid electrolyte membrane
D: Lithium dendrite
301: Porous polymer sheet
301': Heat treated porous polymer sheet
302: Solid electrolyte film
100: Solid electrolyte membrane
101: Porous polymer sheet
102: Solid electrolyte material

What is claimed is:

1. A method for manufacturing a solid electrolyte membrane for a solid-state battery, comprising:
   (S10) preparing a porous polymer sheet;
   (S11) fixing an end portion of the porous polymer sheet and carrying out a heat treatment to provide a heat treated porous polymer sheet;
   (S12) disposing a solid electrolyte film comprising a solid electrolyte material on at least one surface of the heat treated porous polymer sheet to obtain a laminate structure; and
   (S13) pressurizing the laminate structure so that the heat treated porous polymer sheet is filled with the solid electrolyte material,
   wherein the porous polymer sheet in (S10) has a thickness of 5-50 μm;
   wherein the porous polymer sheet comprises a polyolefin-based polymer resin;
   wherein the solid electrolyte material is a polymeric solid electrolyte;
   wherein the heat treatment in (S11) is carried out at a temperature of 50-300° C. for a duration from 10 minutes to 24 hours,
   wherein the porous polymer sheet is fixed during the heat treatment;
   wherein a ratio (B/A) of an average pore diameter (B) of the heat treated porous polymer sheet in (S11) based on an average pore diameter (A) of the porous polymer sheet in (S10) is 1.1-100,
   wherein a ratio (D/C) based on a porosity (D) of the heat treated porous polymer sheet in (S11) and a porosity (C) of the porous polymer sheet in (S10) before the heat treatment is 1.1-3,
   wherein the porous polymer sheet in (S10) is a polymer film obtained by a process comprising melting, extruding and orienting a polymer material through a dry process, or a polymer film obtained by a process comprising extracting a plasticizer through a wet process to form pores, and
   wherein a slurry for the solid electrolyte film comprises a solid electrolyte material and solvent, and
   the solid electrolyte film is obtained by a process comprising drying the solvent in the slurry.

2. The method for manufacturing a solid electrolyte membrane for a solid-state battery according to claim 1, wherein the porosity (C) of the porous polymer sheet in (S10) is 20-50 vol % and the average pore diameter (A) of the porous polymer sheet in (S10) is 20 nm to 500 nm.

3. The method for manufacturing a solid electrolyte membrane for a solid-state battery according to claim 1, wherein the heat treatment in (S11) is carried out at a temperature lower than a melting point of the porous polymer sheet in (S10).

4. The method for manufacturing a solid electrolyte membrane for a solid-state battery according to claim 1, wherein the porosity (D) of the heat treated porous polymer sheet in (S11) is 30-90 vol % and the average pore diameter (B) of the heat treated porous polymer sheet in (S11) is 100 nm to 100 μm.

* * * * *